THEODORE H. WOBERMIN
INVENTOR.

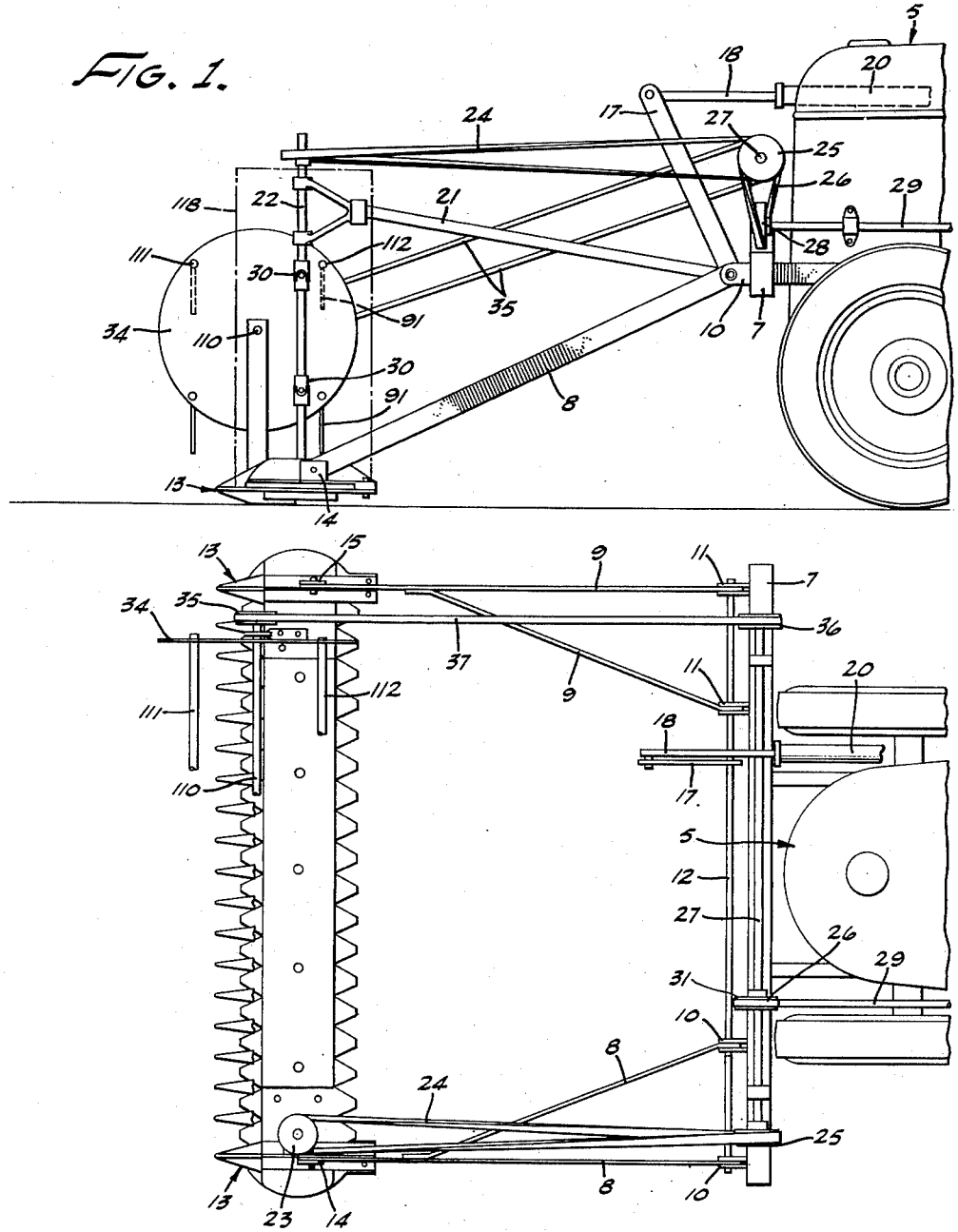

BY

ATTORNEY

May 28, 1957  T. H. WOBERMIN  2,793,487
CHAIN SICKLE MOWER

Filed July 26, 1954  3 Sheets-Sheet 3

THEODORE H. WOBERMIN
INVENTOR.

BY

ATTORNEY

United States Patent Office 2,793,487
Patented May 28, 1957

2,793,487

CHAIN SICKLE MOWER

Theodore H. Wobermin, Oro Grande, Calif., assignor of one-third to Leonard Hurst, one-third to Carl Bergman, and one-third to Russell Turner, all of Lancaster, Calif.

Application July 26, 1954, Serial No. 445,855

3 Claims. (Cl. 56—244)

This invention relates to cutting mechanisms, and particularly to a hay and grain mower of the endless chain sickle type.

The use of endless or continuous chain sickles has been known for some time, as evidenced by U. S. Patents No. 1,865 of April 18, 1865, No. 673,424 of May 7, 1901, No. 1,353,891 of September 28, 1920, and No. 1,851,841 of March 29, 1932.

Although all of the mowers disclosed in these patents utilize a continuous chain to which the cutting knives or blades are attached, and which is utilized in the present invention, the mower described hereinafter is so constructed as to improve this type of mower to make it practical and commercial for use in cutting different types of hay and grains under various condition. It is provided with a basic U frame to which all operating elements are attached to form an integral sickle unit, and is provided with end skids, or shoes, to aid the sickle guards to readily pass over obstructions, such as stones and stumps. The new construction makes it possible to cut hay and grain at substantially ten miles per hour.

The advantages of a continuous chain sickle unit over a reciprocating sickle are well known, the chief advantage being the reduction of vibration and wear. The present unit uses a novel chain guide construction which permits the chain to travel in either direction, the chain passing over stationary cutting edges or blades known as ledger plates. The cutting unit is attached to the front end of a conventional wheel tractor, enabling the tractor to travel in a swath and the operator to drive on "down" hay or grain only and never on standing hay or grain. A hydraulic cylinder is used to raise and lower the sickle bar, the mower being able to cut stubble as short as 1 3/16 inches. The construction of the unit is sufficiently efficient to permit the use of a minimum of power and provide a long life for all working parts.

The principal object of the invention, therefore, is to facilitate the cutting of hay or grain.

Another object of the invention is to provide an improved mowing unit for hay and grain.

A further object of the invention is to provide an improved endless or continuous sickle bar unit for a mowing machine.

The novel features which are believed to be characteristic of this invention, both as to the manner of its organization and the mode of its operation, will be better understood from the following description, when read in conjunction with the accompanying drawings, in which:

Fig. 1 is a side elevational view of a mowing machine embodying the invention.

Fig. 2 is a plan view of the mowing machine as shown in Fig. 1.

Figure 3:
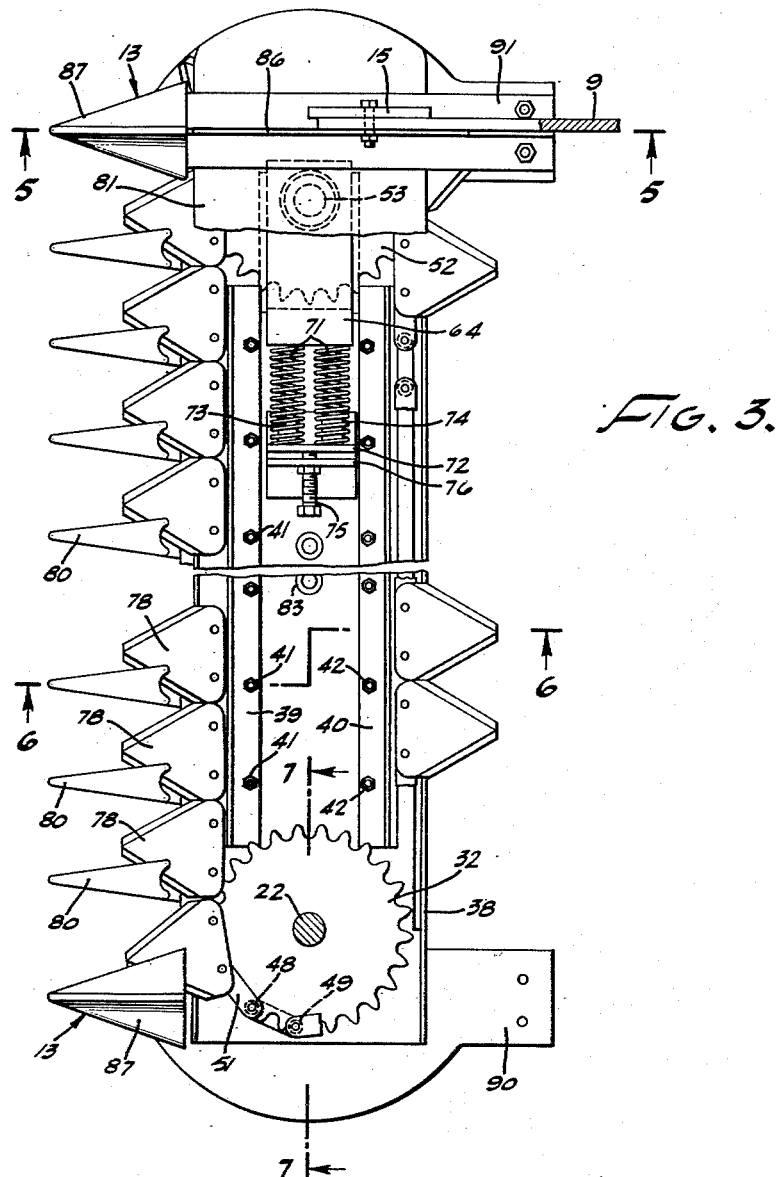
Fig. 3 is an enlarged plan view of the sickle bar used in the mower shown in Figs. 1 and 2.

Referring now to the drawings, in which the same numerals identify like elements, a conventional tractor is illustrated at 5 in Figs. 1 and 2, at the front of which is supported a mowing unit embodying the invention. Attached to a cross frame bar 7 are braces 8 and 9 fixedly mounted on a rod 12 at 10 and 11, respectively, and to the shoes or skids, one of which is shown generally at 13 in Fig. 4 by ears or brackets 14 and 15. An arm 17 is fixedly connected to the rod 12 and to a piston rod 18 of a hydraulic cylinder 20. Thus, the entire sickle unit, supported on the braces 8 and 9, may be raised and lowered to vary the length of the stubble and during transportation of the mower when idle.

Also attached to the cross bar 7 is one end of a brace 21, the other end being connected to a sickle drive shaft 22, the shaft having a pulley 23 at the upper end thereof and around which is a V belt 24, which also passes around a pulley 25 on a jack shaft 27. Another V belt 26 connects a pulley 31 on jack shaft 27, with a drive pulley 28 on the end of a drive shaft 29 connected to the motor in the vehicle 5. A reel 34, having tines for straightening the hay and grain and holding the hay and grain upright during a cutting operation is driven by a pulley 35 from a pulley 36 on jack shaft 27, a V belt 37 connecting the pulleys 35 and 36. The sickle drive shaft 22 has universal joints 30, therein, the lower end of the shaft 22 having mounted thereon a sprocket wheel 32.

Referring now to the sickle bar construction (see Figs. 3, 5, 6, and 7), a main U shaped frame 38 has angle iron members 39 and 40 bolted thereto by bolts such as shown at 41 and 42, respectively. To the sides of the U-shaped plate 38 are riveted by countersunk rivets, such as shown at 47, chain guides of hard steel, one of these guides being shown at 43 and the other of these guides being shown at 44. Similar opposing cooperating guides are riveted to the angle irons 39 and 40, as shown at 45 and 46. Thus, these hard steel guides 43 and 45 at the front of the sickle unit and guides 44 and 46 at the rear of the sickle unit provide the path for and guide an endless chain, made up of rollers such as shown at 48 and 49, interconnected by links, such as shown at 51 in Fig. 3, and at 94 to 99, inclusive, in Fig. 6. To permit the rollers to roll on guides 45 and 46, the diameters of the rollers are slightly less than the spacing between guides 43 and 45 and guides 44 and 46. The rollers, links, and sickle knives 78 are assembled on pins, such as shown at 100 and 101 in Fig. 6, with washers, such as shown at 102 and 103, and cotter pins, such as shown at 104 and 105.

Figure 7:
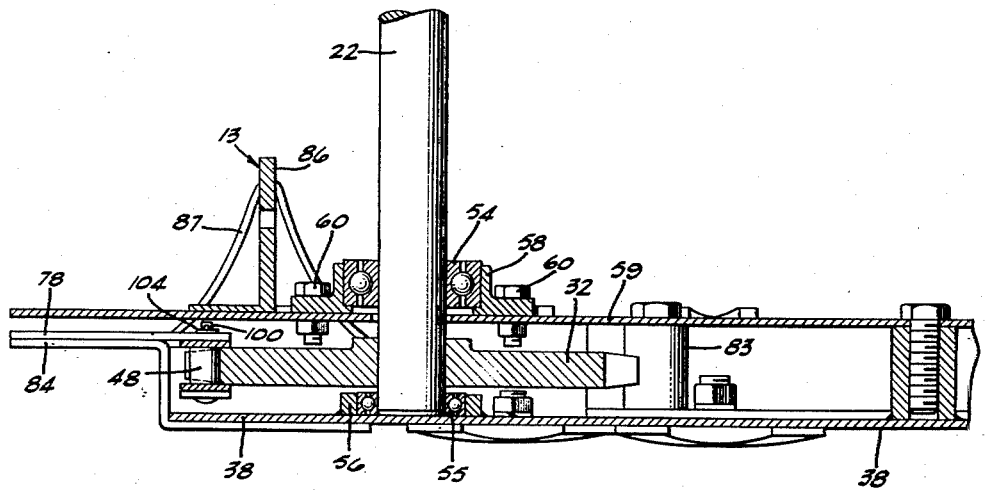
Fig. 7 is a cross sectional view taken along the line 7—7 of Fig. 3.

The sickle, made up of rollers, links, and knives 78, is driven by planetary sprocket 32 and passes around an idler sprocket 52, mounted on a shaft 53. As shown in Fig. 7, the sprocket 32 is mounted on the end of drive shaft 22, which, in turn, is mounted on bearings 54 and 55. The bearing 55 is in a socket 56, welded to the U plate 38, while bearing 54 is mounted in a socket 58, bolted to a plate 59 by bolts 60. The idler sprocket 52 has its shaft 53 in bearings 62 and 63 in a mount 64—65 slidable between respective guides 66 and 67, welded respectively to a top plate 69 and U plate 38.

The sickle, therefore, is driven around the respective sprockets 32 and 52, the sprocket 52 being tensioned by springs 71 abutting the ends of mount 64 and 65 and a plate 72, having studs 73 and 74 over which the ends of the springs 71 are fitted. The plate 72 is adjustable by a bolt 75 passing through an angle iron 76 attached to the U plate 38.

Figure 6:
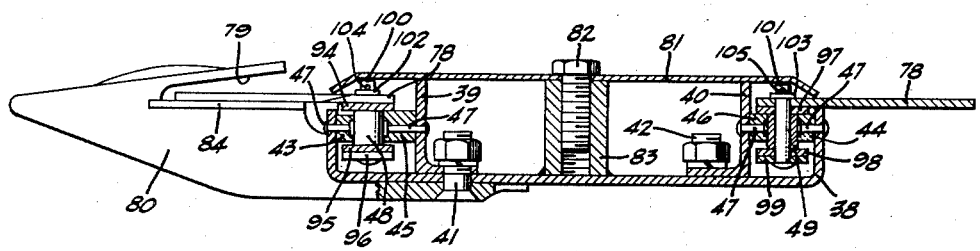
Fig. 6 is a cross sectional view taken along the line 6—6 of Fig. 3.

The knives 78 of the sickle pass between the notched portions 79 of the knife guards 80, which are attached to the U plate 38 by bolts such as shown at 41 in Fig. 6, the guards, of course, being only on the front side of the U frame member 38. Ledger plates or stationary cutting blades 84 are attached to each guard. To cover the ends of the pins, such as 100 and 101, a cover plate 81 extends along the length of the U plate 38 and has bent-over ends to prevent hay and other foreign matter getting entangled with the chain. The plate 81 is fastened by bolts 82 threaded in studs 83 welded to the plate 38.

Figure 4:
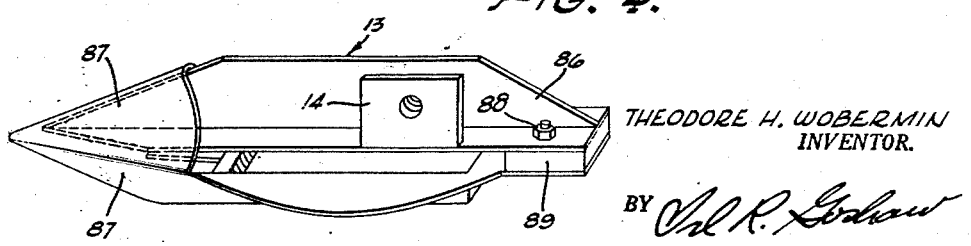
Fig. 4 is an enlarged perspective view of an end skid, or shoe, of the sickle bar of the mower.
Figure 5:
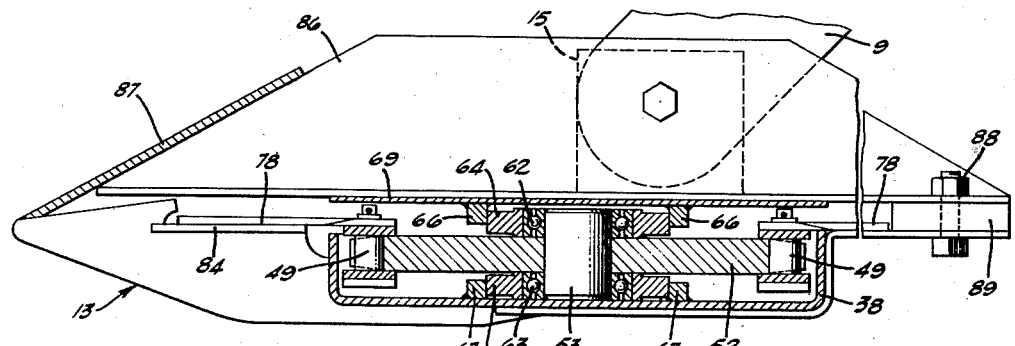
Fig. 5 is a cross sectional view taken along the line 5—5 of Fig. 3.

To protect the sickle bar and permit it to ride over obstacles, two shoes or skids, as shown in Fig. 4, are provided at the ends of the bar. These skids, as mentioned above, are composed of a T shaped iron member 86, the front end of which is tapered and over which is fitted the shoe proper 87. The rear end of the shoe 87 is attached to the rear end of plate 86 by bolts, such as shown at 88, passing through the two plates which are separated by a spacing block 89. These shoes are left and right handed, such as shown at 90 and 91 in Fig. 3, and are fastened to the U plate 38 by suitable bolts, as shown in Fig. 7.

The reel 34, with its shaft 110 driven by the belt 37, has four rows of tines, as shown at 91, the tines being mounted on four rods, positions of two of which are shown at 111 and 112 in Fig. 2. The reel and tines are any standard unit in which the tines remain in vertical planes as the reel is rotated. A shield 118 keeps the standing grain from becoming entangled in the drive shaft 22 and gear 32 and narrows down the swath to keep the fallen hay approximately 10 inches from the standing hay.

The sickle bar as above described is an integral unit, all elements of which are attached to the U-shaped basic frame member 38. Although the construction reduces wear to a minimum, all wearable elements are either bolted or riveted so that the replacement thereof may be made easily and quickly.

I claim:

1. A mower comprising a solid one-piece rectangular U-shaped frame having a base and parallel sides, angle members having one side of each attached to the base of said frame and the other side of each extending parallel with a side of said frame, said parallel sides of said angle members being positioned between the sides of said frame, guide members attached to opposing surfaces of said sides of said frame and said parallel sides of said angle members, a sprocket wheel rotatable at each end of said frame, a link roller chain around said wheels and movable between said guides, sickle knives attached to said chain and extending over the edges of the sides of said frame, a skid shoe attached to each end of said frame and having a portion extending beyond the end of said frame and beyond the ends of said sickle knives when around a respective sprocket wheel, and a cover plate over each of said sprocket wheels and said sickle knives when around a respective sprocket wheel.

2. A mower in accordance with claim 1 in which a drive shaft is provided for one of said sprocket wheels together with means for transporting said mower and supplying power to said drive shaft.

3. A mower in accordance with claim 1 in which springs are mounted on said base of said frame between the parallel sides of said angle members to provide a predetermined pressure on one of said sprocket wheels.

References Cited in the file of this patent

UNITED STATES PATENTS

| | | |
|---|---|---|
| 1,851,840 | Huff | Mar. 29, 1932 |
| 2,304,174 | Hurst | Dec. 8, 1942 |
| 2,481,364 | Strong | Sept. 6, 1949 |